United States Patent [19]

Burbo et al.

[11] 4,449,787

[45] May 22, 1984

[54] NIGHT VISION IMAGING SYSTEM ADAPTED FOR HELMET MOUNTING

[75] Inventors: James H. Burbo; Louis P. Hartman, both of Roanoke, Va.; Douglas M. Spranger, New York, N.Y.; Malcolm J. Brookes, New York, N.Y.; Paul J. Mulhauser, New York, N.Y.

[73] Assignee: International Telephone and Telegraph Corporation, New York, N.Y.

[21] Appl. No.: 360,727

[22] Filed: Mar. 22, 1982

Related U.S. Application Data

[63] Continuation of Ser. No. 171,223, Jul. 22, 1980, abandoned.

[51] Int. Cl.³ .............................................. G02B 23/12
[52] U.S. Cl. ................................... 350/538; 350/548; 350/549; 350/145
[58] Field of Search ............... 350/538, 547, 548, 549, 350/145, 146; 250/213 VT, 213 R, 330, 333; 2/452, 453

[56] References Cited

U.S. PATENT DOCUMENTS

| | | | |
|---|---|---|---|
| 2,517,892 | 8/1950 | Larrabee et al. | 350/547 |
| 2,625,855 | 1/1953 | Gaynor | 350/549 |
| 2,649,019 | 8/1953 | Hartline et al. | 350/547 |
| 2,651,872 | 9/1953 | De Salardi | 350/547 |
| 2,757,574 | 8/1956 | Thorburn | 350/145 |
| 2,848,924 | 8/1958 | Potez | 350/549 |
| 3,787,688 | 1/1974 | Stone | 350/72 |
| 3,971,933 | 7/1976 | Adamson | 250/213 VT |
| 4,202,601 | 5/1980 | Burbo et al. | 350/438 |

*Primary Examiner*—Jon W. Henry
*Attorney, Agent, or Firm*—John T. O'Halloran; Robert P. Seitter

[57] ABSTRACT

There is disclosed a night vision imaging system for mounting on a helmet. The helmet contains a visor having a slot into which is inserted a helmet mount assembly which can be vertically adjusted within the slot by means of a control mechanism including a rotatable knob. The mount assembly is an arcuate planar member conforming to the surface of the helmet and contains two "U" shaped receptacles for receiving two pivots located on a central fork support frame. The fork frame has two adjacent tines which are secured within two slots contained in a gear box. Coupled to the gear box are right and left carriage assemblies which interface with the gear box by means of a first threaded shaft to afford eye relief adjustment and a second rod assembly to afford tilt adjustment. Each carriage assembly is symmetrically positioned on the right and left sides of the gear box assembly and are coupled to a first and a second unity power image intensifier telescope housing containing an image intensifier tube. The carriage assembly is coupled to the tube housing to move in a horizontal plane for eye relief by contacting either a right or left knob coupled to the threaded shaft at right and left sides. The gear box, carriage assemblies, and intensifier housing as supported by the fork frame, can be "flipped-up" and away from the eyes of a user when the night vision system is not in use or can be "flipped-down" in front of the user's eyes when in use.

25 Claims, 11 Drawing Figures

0.75 INCHES TRAVEL TO GIVE 15mm EYE RELIEF

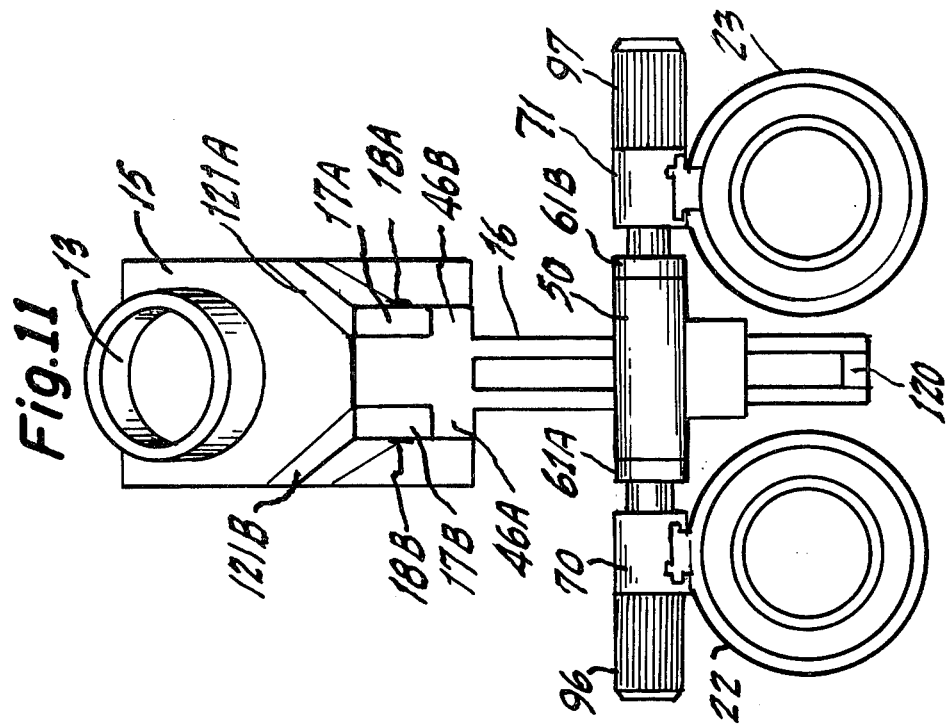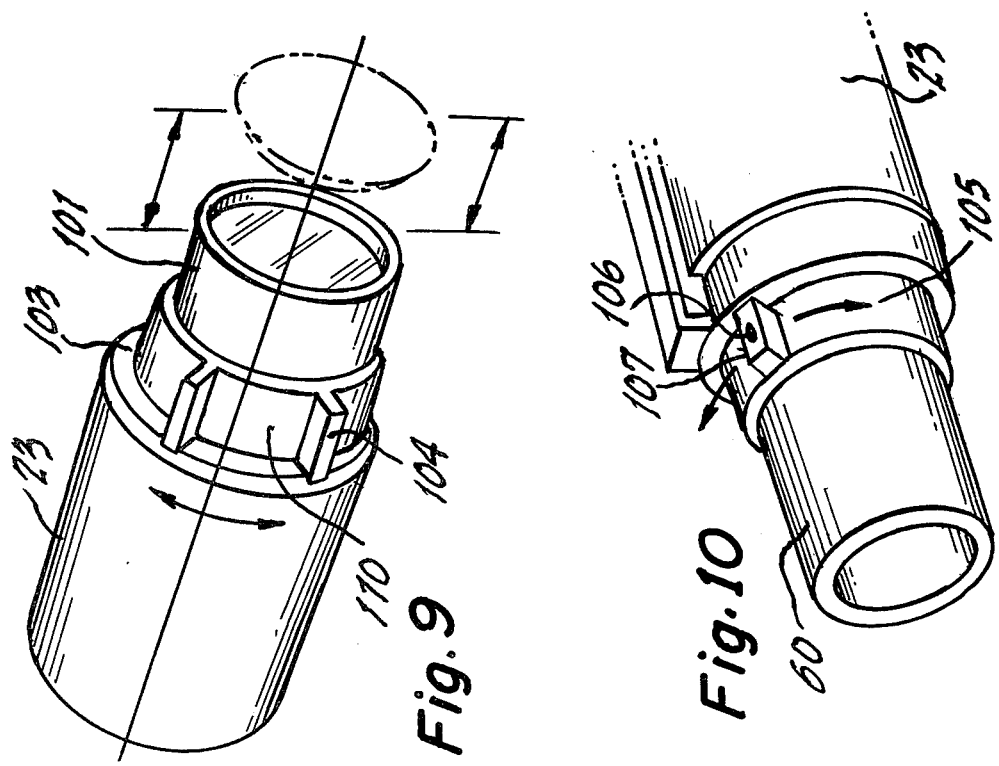

NIGHT VISION IMAGING SYSTEM ADAPTED FOR HELMET MOUNTING

This is a continuation, of application Ser. No. 171,223, filed July 22, 1980, now abandoned.

BACKGROUND OF THE INVENTION

This invention relates to night vision imaging systems in general, and more particularly to an aviator's night vision imaging system particularly adapted to be selectively mounted on a helmet.

The term night vision imaging system can be interpreted broadly enough to encompass such disparate items as matches and flashlights at one extreme, to pulse illuminated, range gated, low light television systems at the other extreme. Such systems include direct viewing systems employing image intensification. These systems have various uses as commercial as well as military applications, but in general, enable night time vision by responding to low level radiation which is present at night as, for example, to reflected light emanating from the stars or the moon. The techniques are also applicable to viewing objects at night, which objects emit heat or infra-red radiation, which radiation can be detected by night vision imaging techniques.

Such devices conventionally employ an image intensifier or similar structure. The function of the intensifier is to multiply the amount of incident light received by it to provide a greater signal for application to a camera or directly to the eyes of a user. Examples of early uses of such devices can be had by reference to a text entitled "Photo Electricity and Its Applications" published in 1948 by John Wiley & Sons. Chapter 18 entitled "Light Beam Signaling and Infra-red Detection" shows examples of early night vision imaging systems such as the "Sniperscope" and "Snooperscope". These devices are employed by the military to enable troops to perceive the enemy at night, but as indicated, many non-military applications are applicable.

There have been significant strides made in the development of night vision imaging systems enabling the fabrication of devices which are relatively compact and reliable. Hence, various companies as the Assignee herein, provide a number of devices such as night vision goggles and other imaging systems for night time viewing. Indicative of such systems is the apparatus depicted in U.S. Pat. No. 4,202,601 entitled TRAINING AID FOR USE WITH NIGHT VISION APPARATUS, issued on May 13, 1980 to J. H. Burbo and L. P. Hartman and assigned to the Assignee herein. This patent depicts a night vision goggle assembly which is secured to the head of a user by means of a strap and enables a user to perceive at night with great acuity and perception. Such goggles are manufactured by ITT Electro-Optical Products Division of Roanoke, Virginia and designated as No. F-4921. These goggles are employed in military applications or in other specified activities such as flying aircraft, driving or weapons operations.

Other devices manufactured by ITT as F-4923 include night vision goggles for aviators. These goggles include a night viewing system having image intensifier tubes combined with plastic optics and are adapted to be secured to a flight helmet using hook tape and snap fasteners or can be worn on the head by the use of standard headstraps.

Based on extensive use of such devices, it has been determined that the night imaging system is extremely desirable, but there is an absolute need, expecially for use in aviation, to intimately and reliably integrate the imaging system with the helmet. In prior art devices, such as the above noted goggles, the pilot could not easily remove, adjust or otherwise conveniently employ the goggles, while operating the aircraft. Hence, the goggles were employed in limited operations and did not provide the user with the versatility required. The requirements imposed by flying an aircraft or otherwise manipulating any vehicle under stress conditions, impose formidable factors in the implementation of a compatible night vision imaging system operating in conjunction with a helmet. These factors must consider the practical application of human engineering principles, coupled with skillful optical, mechanical and electrical engineering to provide a night vision device that is efficient and useful to the population of aviators who will fly with it. Major factors in such design are associated with the difficult requirement of maintaining the weight of such apparatus to a minimum; a necessary factor in regard to aviation equipment.

It is therefore an object of the present invention to provide an improved night vision imaging system adapted to be mounted on a helmet, which combination of apparatus provides extreme versatility to a user, such as a pilot, to enable optimum use of the apparatus under extreme stress conditions.

BRIEF DESCRIPTION OF THE PREFERRED EMBODIMENT

A night vision imaging apparatus for mounting on a helmet or similar article comprises a helmet mount assembly secured to said helmet at a front surface above the position of the eyes of a user when said helmet is being worn, said assembly containing a female pivot receptacle positioned on said assembly closest to the eyes of said user and an image intensifier assembly having a first and a second tubular housing, each containing a night vision imaging optical system and spaced apart according to the separation of the eyes of said user, said assembly including a central support arm centrally positioned between said tubular housings and having a top male pivot for engaging said female pivot receptacle and including locking means for enabling said intensifier assembly to be "flipped-up" and locked in position away from the eyes of said user and to maintain said position and to be "flipped-down" by said user from said locked position to cause said tubular housings to be respectively positioned in front of said user's eyes.

BRIEF DESCRIPTION OF THE DRAWINGS

Above-mentioned and other features and objects of this invention will become more apparent by reference to the following description taken in conjunction with the accompanying drawings, in which:

FIG. 9 is a partial perspective view depicting an eyepiece diopter adjustment mechanism;

FIG. 10 is a partial perspective view depicting an objective lens adjustment; and FIG. 11 is a front view of the night vision imaging system.

DETAILED DESCRIPTION OF THE INVENTION

Figure 1:
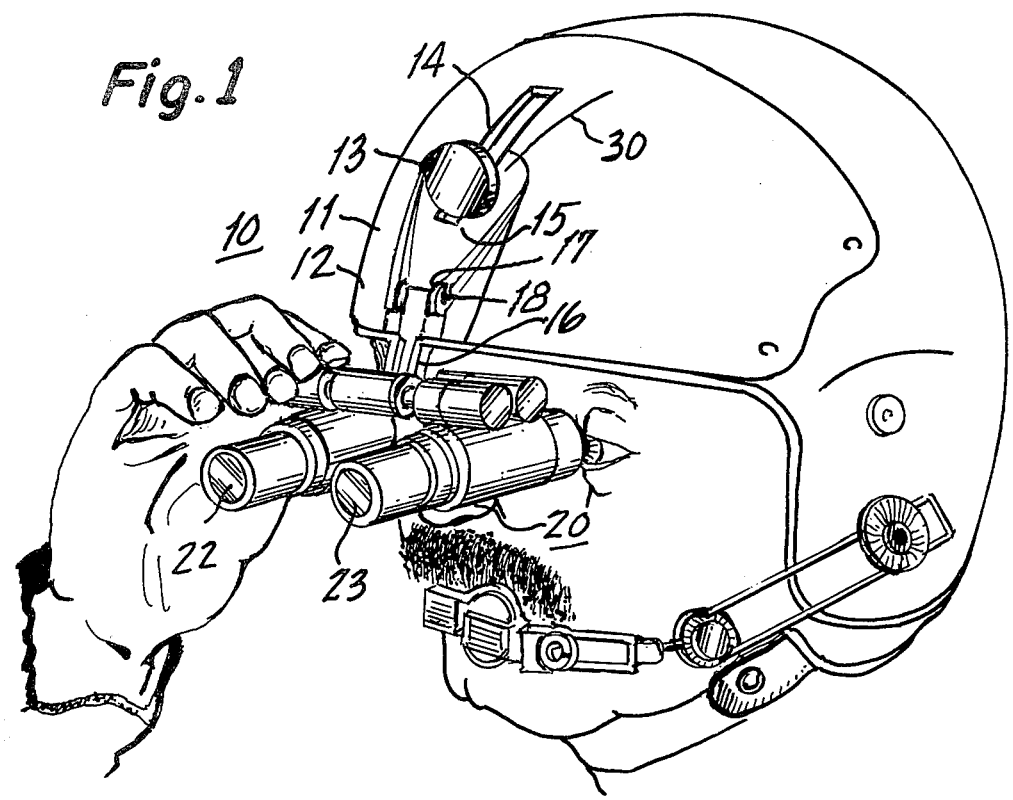
FIG. 1 is a perspective plan view of an aviator's night vision imaging system (ANVIS) according to this invention.

Referring to FIG. 1, there is shown a perspective view of an aviator's night vision imaging system (AN-VIS) 10. Essentially, the system is particularly useful for helicopter pilots enabling them to perform complicated night missions with optimum viewing capability. However, it is understood that the system to be described can be employed in any night time operation and hence, users can include tank operators, foot soldiers and so on.

A user has a helmet 11 positioned on his head. The helmet is of a relatively conventional configuration, but is associated with a mounting assembly 15 adapting it for use in this application. The basic helmet configuration is employed by the military and designated as the SPH-4 by the United States Army. The helmet 11 contains a front visor portion 12. The visor 12 has a relatively central slot 14 into which the helmet mounting assembly 15 is emplaced.

As will be explained further, the helmet mounting assembly 15 provides U shaped receptacles which provide a snap in, snap out positive quick release action by which an imager assembly 20 is retained to the helmet 11. The imager assembly 20 depends from the mounting assembly 15 via a pivotable fork assembly 16. The fork assembly 16 has a pair of shoulders 17 adjacent to pivot pins 18 on the upper end of the fork assembly which engage with the outer surfaces of a V receptacle associated with the mounting assembly 15. The mounting assembly 15 further includes a mounting knob 13 which, when pushed in and rotated, enables vertical adjustment of the imaging assembly 20.

The imaging assembly 20 basically consists of two unity power telescopes 22 and 23, each incorporating an image intensifier tube and associated optics. As seen from FIG. 1, the imaging assembly 20 is supported before the user's eyes and equipped with adjustments and other features necessary for the user's comfort, convenience and safety. A power cable 30, as will be explained, interfaces with a power pack (not shown) which supplies operating power for the intensifier tubes and which pack may be positioned at the rear of the helmet for interfacing with a source of power contained in the vehicle or aircraft.

As will be explained, the imaging assembly 20 is associated with a plurality of symmetrical adjustment mechanisms to accommodate a wide variety of users and to enable the helmet and assembly to be universally employed in diverse applications and environments.

As one can see from FIG. 1, the entire apparatus is of a generally simple design as a major aspect in the implementation of this system is to minimize the number of components to thereby increase reliability, reduce maintenance and achieve substantial savings in component costs.

Figure 2:
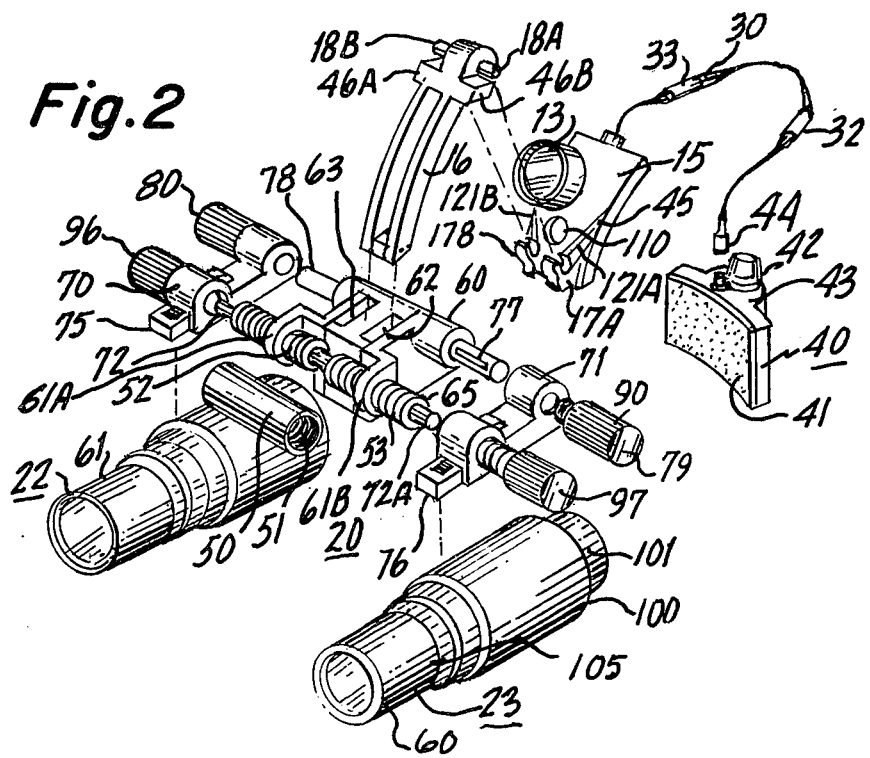
FIG. 2 is an exploded plan view depicting the apparatus in an assembly format.

Referring to FIG. 2, there is shown an exploded view of the imaging system 20, the helmet mount assembly 15, the power cable 30 and includes a power pack 40 which was referred to in conjunction with FIG. 1, but not shown. Essentially, the power pack assembly 40 has a hooked male velcro strip 41 secured on the inner arced surface of the connector assembly. The arc is curved to accommodate the shape of the helmet 11 which, as indicated, may be an SPH-4 helmet. The velcro strip is approximately 2¼ by 1¼ inches and a 2 by 3 inch female velcro patch is cemented or otherwise secured to the back of the helmet located about the center line of the helmet with its lower edge approximately 1¼" from the lower back edge of the helmet 10. Location of the power pack 40 within this patch maintains the placement of the center of gravity of the helmet and imaging system assembly within desired limits and this occurs, as will be explained, when the imager assembly 20 is in either the "flip-up" or "flip-down" position.

The power pack contains a battery located therein. The power pack may receive a source of potential at a suitable connector on the under surface and hence, the battery located within the power pack may be charged from the aircraft power supply.

On the upper surface of the power pack 40, there is shown mounted a rotary 90° arc detented switch 42. The switch is coupled to a knob which is used to control actuation of the power and hence, serves as an on/off switch. The On position manifests a clockwise rotation of the knob 42, while the Off position is a counterclockwise motion. Since the switch 42 is mounted at the rear of the helmet, it is not visible by the operator and hence, it is necessary that the position be clearly identified by touch and therefore, the switch possesses a unique bar shape and requires a 90° travel for actuation. A smaller arc of travel may not be readily sensed by an operator, due to the fact that he will be normally wearing flying gloves, which gloves will affect touch sensitivity.

The control switch 42 is located symmetrically on top of the power pack 40 with its rotational axis at an angle of about 23° to the normal vertical of the power pack. This angle constitutes an optimum angle enabling operation of the control in an extremely reliable manner. As shown in FIG. 2, the knob 42 is mounted at the rear of the power pack assembly on the extending central bell-shaped surface to provide ample clearance for the fingers of a user.

On the center symmetrical axis of the top of the power pack is a connector 43 which interfaces with the connector 44 associated with the power cable 30. The length of the power cable 30 is such that the power supply 40 can be mounted, either on the rear of the helmet as described, or can be placed in the upper left pocket of the aviator.

The cable is dressed by means of cable dressing sleeves 32 and 33. Due to the fact that the above described location would require cables of different lengths, dressing sleeves 32 and 33 are employed so that when the power pack is mounted on the helmet, the cable is shortened. The cable dressing sleeves essentially consist of two 2" lengths of oversize sleeving into which the power cable 30 is doubled in a sheep-shank link manner. A straight pull of approximately three pounds releases the cable from its restraining sleeves.

The other end of the cable engages or is coupled to the helmet mounting assembly 15.

Figure 3:
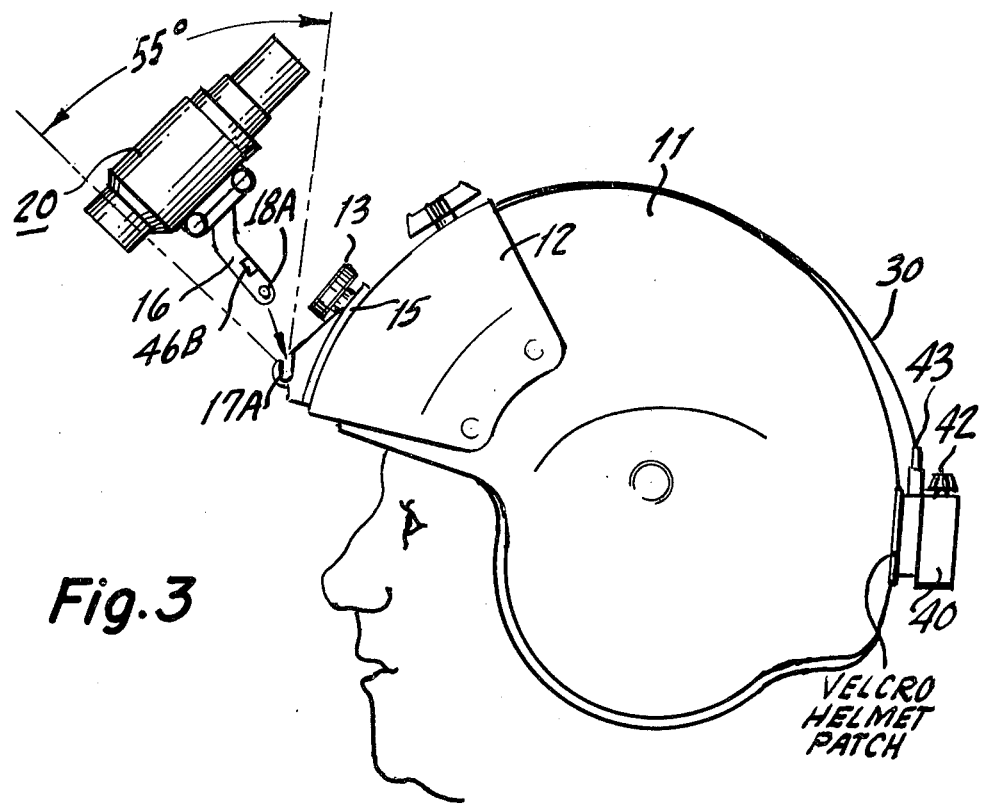
FIG. 3 is a side elevational view portraying the angle of acceptance of an imager assembly with respect to a helmet mounting assembly.

As shown in FIG. 2, the helmet mounting assembly 15 employs two U-shaped receptacles as 17A and 17B at the bottom of the curved front surface 45. A pair of shoulders 46A and 46B are associated with the fork assembly 16 and are located adjacent to pivot pins 18A and 18B and engage with the outer surfaces of the receptacle in the helmet mount assembly 15. This provides a pivoting action enabling the imager assembly 20 to be swung up high. The shoulders 46A and 46B serve to lock the two parts together, as will be explained. The position of the shoulders on the fork assembly 16 are located such that the assembly 16 will be accepted for engagement by the receptacles 17A and 17B within a tolerance of 55° of arc. This is depicted in FIG. 3. This acceptance angle insures that the aviator does not have to fumble or switch for a critical angle of acceptance. The positive snap action of the engagement between the fork 16 and the helmet mount assembly 15 is implemented to give the aviator kinesthetic feedback on the success of his actions, as this procedure is accommodated when the helmet is being worn.

As will be explained, the imager assembly 20 cannot be swung down until the pivot pins 18A and 18B properly engage the U-shaped receptacles 17A and 17B. Once the pivot pins 18A and 18B are engaged in the U-shaped receptacle and the imager assembly is pivoted downward to a normal position, electrical contact is made between the helmet mount 15 and the image intensifier assemblies as 22 and 23. As the imager assembly swings into its down position by the locking shoulders 46A and 46B engaging the undersurface of the receptacles 17A and 17B, a positive electric contact is assured, and further restrains the imager assembly 20 from flipping upward under moderate g loads.

As will be explained, once the aviator has made proper occular adjustments, each time the imager assembly is replaced and removed, the reference point on the helmet remains the same. The pivot pins 18A and 18B are designed to break away from the U-shaped receptacles at 15 g loads to minimize the risk of damage to the aviator's head during a crash.

Whenever the imager assembly 20 is flipped up, the electrical connector is opened, thereby automatically turning off the image intensifiers and minimizing battery use. The flip-up position is also maintained by a snap in positive action. All snap in features accommodated in the design are spring loaded and do not involve mechanically latched clamps. Thus, the aviator can overcome the force of opening by use of a single hand enabling him to pivot the image assembly between positions or to separate the same from the helmet. Since the design is symmetrical about the sagittal plane, any actuation can be made with either hand.

Figure 4:
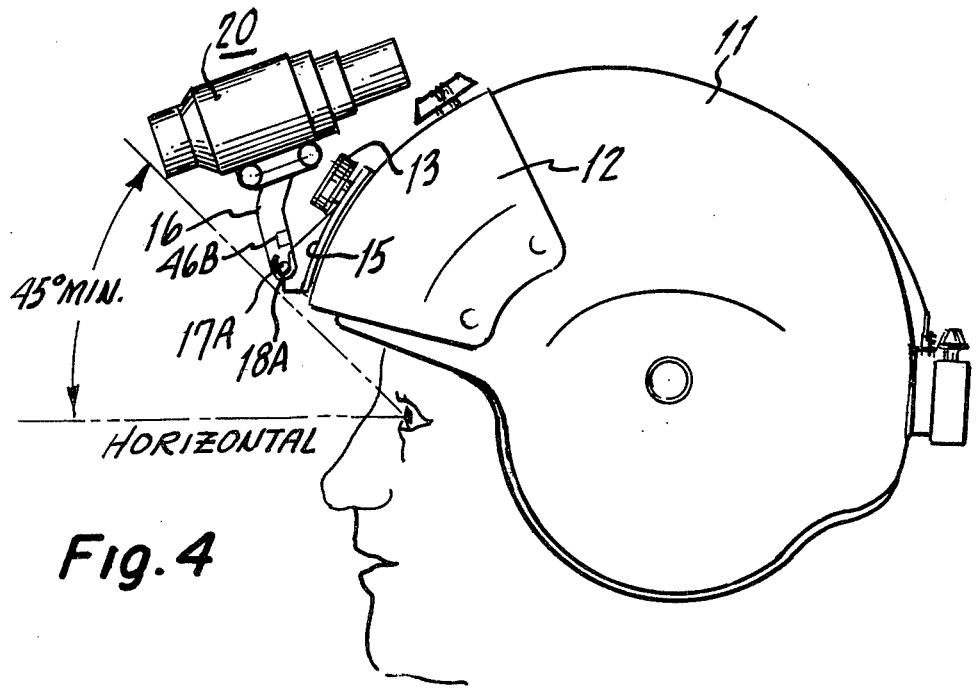
FIG. 4 is a side elevational view depicting the "flip-up" state of the apparatus.

In the flip up position as shown in FIG. 4, most proximal elements of the imaging system 20 are at least 45° above a normal (horizontal) line of sight. It is interesting to note that from observations, a horizontal line of sight is not necessarily normal to human comfort or normal to the visual tasks which an aviator may be undertaking. Thus, according to MilStd-1472, a normal line of sight is, in fact, 15° below the line between an observer's eye and the horizon.

In any event, in flying, particularly in nap of the earth missions, an aviator needs to be visually alert in directions other than a militarily assumed normal attitude. Thus, the position of the intensifier 20 shown in FIG. 4 assures location above the line obscured by the aviator's helmet, including those cases where the glabella-vertex height is greatest, while the glabella-internal canthus height is co-jointly at a minimum. The glabella is the flat area of bone between the eyebrows and is used as a craniometric point. The canthus is the angle or corner on each side of the eye formed by the junction of the upper and lower lids.

The path selected through which the imager assembly 20 can swing is a tradeoff between that dimension needed for vertical adjustment to accommodate a wide range of aviator population; the angle needed to avoid any portion of the intensifier from obstructing the normal field of view, and that dimension which governs the movement of the center of gravity of the imager assembly 20.

When the imager intensifier 20 is attached and lowered to the down position, the center of gravity of the head and the helmet advances by approximately 0.6". This represents a turning movement of about eight ounce-inches, if the aviator is in an erect posture. The center of gravity of a typical helmet (weight about three pounds, four ounces) is forward of that of the mean center of gravity position of the head. The center of gravity location is governed by the combination of head length (glabella to occiput) and glabella to vertex distance. In the design, the zero reference point is taken at the glabella. Such a reference point determines that the center of gravity of smaller and lighter heads is closer to the mass of the intensifier assembly 20. Thus, there will be little discrimination in comfort across the range of users. Hence, in regard to the angle discussed, there is relatively no noticeable difference in head movement when the intensifier is in the flip-up or flip-down positions.

Referring back to FIG. 2, the mounting knob 13 associated with the helmet mounting assembly enables the user to perform vertical adjustment. With the visor 12 of the helmet in the up position, the mounting assembly 15 is located in the visor slot 14 by a spring loaded T-shaped catch. When the helmet mounting assembly knob 13 is pushed inward and rotated, a T-shaped bar, which is the stop of the knob's shaft, can be aligned vertical to fit inside the visor slot.

Figure 5:
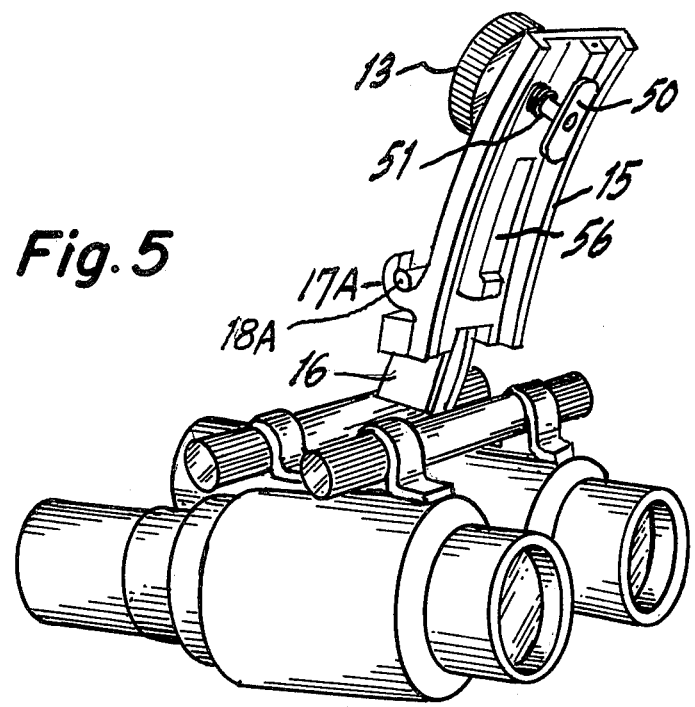
FIG. 5 is a rear perspective view of a helmet mounting assembly.

By referring to FIG. 5, there is shown the T-shaped bar 50 which is coupled to a shaft 51 associated with the knob 13. As can be seen, the T-shaped bar is shown in position where it is vertically aligned with the slot 14 on the helmet. Rotating the knob 13 engages the T stop with a retainer and the knob can now be screwed down to clamp the visor between its frame and the T stop. The action of locating and attaching the helmet mount 15 is one handed and can be accomplished when the aviator is wearing his helmet. The size of the knob 13 is such to allow a firm grip with four digits of a gloved hand. The circumference of the knob as shown in FIG. 2 is milled with a square cut to stop finger slip.

The mounting assembly can be adjusted in the vertical direction over a length of travel in the visor slot 14 of some 3¾", which represents approximately 23° of arc subtended at the center of the arc of the visor. This translates to approximately 1.250" of vertical adjustment subtended at the objective lenses 60 and 61 associated with the image intensifier assemblies 22 and 23. To accommodate helmet settling during flight, particularly in a vibrating helicopter, the mechanism enables fine adjustment within the slot 14.

In regard to the vertical adjustment above described, it has been determined experimentally that the variability in glabella-vertex distance in the first to ninety-ninth percentile of population is approximately 1.71". Helmet wearers are taught to adjust their helmets so that the front edge of the helmet is no more than ¾" above the brow line. Hence, a total range of vertical adjustment of about ⅝" upwards and downwards of a mean value would accommodate the spectrum of all potential users; that is 1" of helmet adjustment plus 1¼" of optical adjustments should accommodate the extremes of variability, 1.71" identified by the reference data.

As can be depicted by viewing FIGS. 3 and 4, for example, it is shown that as the vertical adjustment mechanism is slid in the visor track, the imaging assembly follows the arc of the helmet as distinct from rising solely in a vertical plane. This is preferred as vertical adjustment is necessary to accommodate for two effects; first, the anthropometric variability between users and, second, the smaller variation and movements which may occur in helmet slippage during a mission. In order to accommodate both problems, it has been determined that utilizing the natural arc of the visor slot provides a positive human factors advantage in ease of adjustment during flight operations. Hence, any change in helmet position caused by natural settling of the helmet strap in flight is directly compensated for by the vertical adjustment mechanism at no weight penalty.

Referring to FIG. 2, the imager assembly 20 contains adjustment mechanisms for tilt adjustment, eye relief, and interpupillar adjustment together with the optics image intensifier assemblies. Each adjustment, as will be explained, must be determined by the following five factors:

(1) the mean point of that adjustment;
(2) the range of that adjustment;
(3) the control movement ratio;
(4) the frequency of use of each adjustment; and
(5) the ease of actuation of that adjustment.

Shown in FIG. 2 is an interpupillary adjustment knob 50. The knob 50 has an internal thread 51 which is positioned over the threaded rod members 52 and 53 retained within a tilt and interpupillary adjustment gear box assembly 60. The gear box assembly possesses two slots as 62 and 63 which accommodate the ascending tines of the fork assembly 16. The rotary knob is set between the left and right carriage assemblies 70 and 71, which contains apertures to accommodate the smooth ends as 72 of the threaded rod members 52 and 53.

In order to accommodate the threaded rod which has a right and a left hand thread as 52 and 53, the gear box assembly 60 has two depending flanges 61A and 61B, each having a coaxial aperture for accommodating and receiving the threaded shaft 65. Hence, upon rotation of the shaft 65 via the adjustment knob 50, the flanges flex inwardly to provide movement of the intensifier assemblies 22 and 23, thus affording the interpupillary adjustment. This adjustment, as will be explained, is relatively small, but sufficient to accommodate a wide variety of users.

The range of adjustment covers the extreme limits of 51 mm to 72 mm. Member 52 comprises a left hand thread, while member 53 comprises a right hand thread. The threads run inward and outward as the control knob 50 is rotated. The carriage assembly includes slidable block members as 75 and 76 to which are attached the image intensifier assemblies 22 and 23. The carriage assemblies are restrained from rotating since they also ride idly on the second shaft as 77 and 78 which is coupled to the carriage assemblies 70 and 72. The shafts 77 and 78 are coupled to symmetrical tilt knob assemblies as 79 and 80 which, as will be explained, are used to drive the tilt mechanism. The rods 77 and 78 are coupled to the tilt gear box assembly 60. The knob 50 can be grasped with either hand as there is ample clearance about the knurled knob. The image intensifier tubes 22 and 23 are adjusted symmetrically at the first control actuation and hence, in dependent adjustments are no longer required. Interpupillary adjustments are infrequently made once adjusted for an individual and the thread stiffness is selected so that vibrations do not alter settings and hence, once the interpupillary adjustment is facilitated via knob 50, there should be no requirement for further adjustment.

Figure 6:
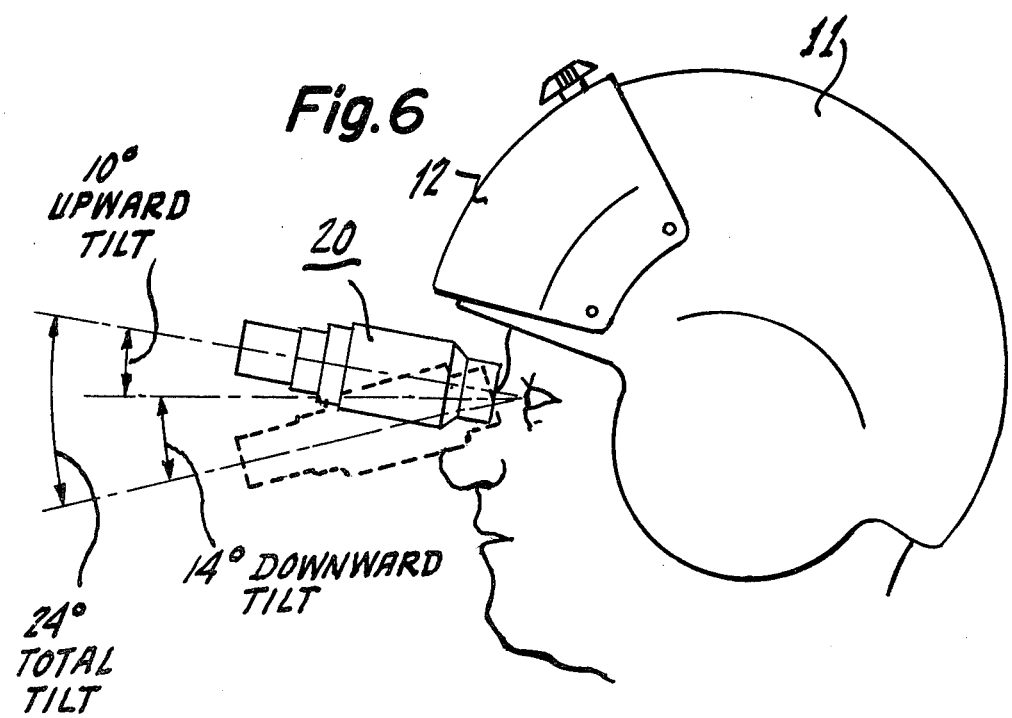
FIG. 6 is a partial side view of the apparatus in a viewing position and depicting a tilt adjustment capability.

Referring again to FIG. 2, there is a need to provide a considerable adjustment for tilt in the apparatus. Essentially, prior art equipment served to interfere with the helmet in such a manner that no amount of tilt or vertical adjustment could realign the optical axis of the instrument due to the interference of the equipment with the helmet. As indicated above, a normal or normally andoptic line of sight is usually a 15° of arc below an eye horizon zero reference line. In particular, in helicopter flying, the normal angle of vision is governed by the type of flying and the angle of reclination of the pilot as seated. Based on the assumption concerning this angle, a normal line of sight may be as much as 10° or more below a ground defined horizontal line of sight. In regard to many considerations, a −10° angle is selected as a nominal value and a tilt adjustment between +10° and −14° is provided about that declination. The upper limit of travel is limited by the interference fit between the image intensifier assembly and the lower edge of the helmet. Referring to FIG. 6, there is shown an illustration of the tilt angle adjustment available with the apparatus described in FIG. 2.

The imaging assembly 20 is tilted about a point centered in the exit pupil of the system adjusted to midway in eye relief and midway in eyepiece dioptic adjustment. It is also apparent that there is a degree of far center tilt built into the system due to the vertical adjustment which is arced about the surface of the visor.

In order to afford tilt adjustment, the tilt knobs 79 and 80 can be accessed with either the left or right hand of the pilot. The knobs are retained on the shafts 77 and 78 through set screws as 90 and operate to tilt the assembly over the arc range depicted in FIG. 6. As again shown, the knobs are knurled and there is ample clearance for a gloved hand to perform such control.

Figure 7:
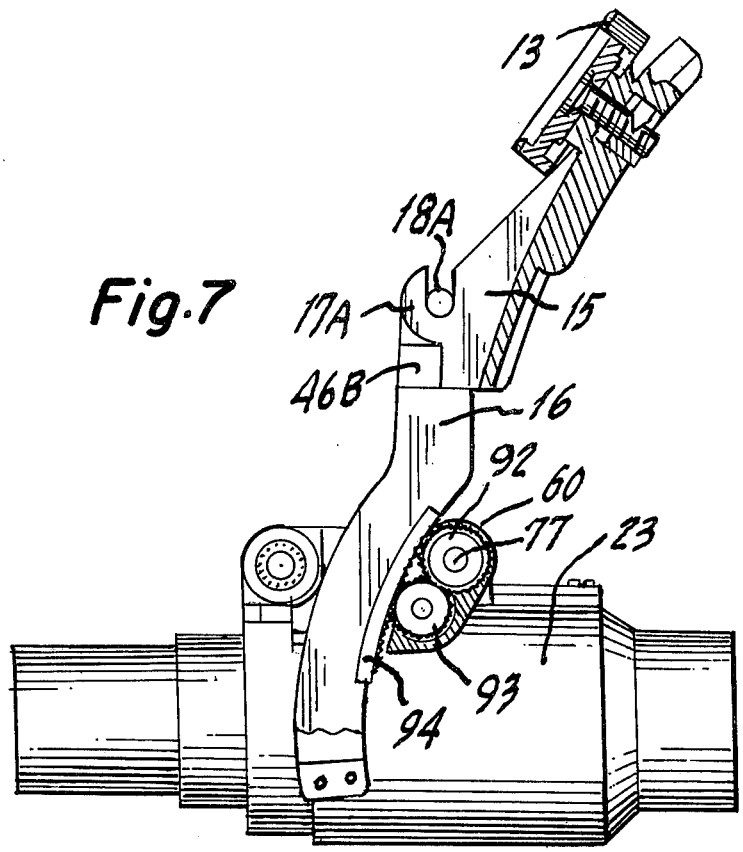
FIG. 7 is a partial cross sectional side view depicting a control gearing arrangement for tilt operation.

By referring to FIG. 7, there is shown the tilting mechanism. The gear box 60 is shown in cross sectional view and shaft or rod 77 is coupled to a gear 92 which drives a gear 93. Essentially, a rack and pinion mechanism is positioned on each tine of the fork 16. The pinion 94 which is coupled to gear 93, affords a gear reduction designed to provide the user with a sensitive fine tilt control. This enables the aviator to make small adjustments necessary to optimize his field of view.

Also shown in FIG. 2, there are two additional knobs 96 and 97 at the left and right hand sides of carriage assemblies 70 and 71 and coupled to the shaft ends as 72 and 72A. The knobs 96 and 97 provide eye relief (fore and aft) control. Eye relief is necessary so that the exit pupil can be set at the nominal 15 mm from the user's eye.

The image intensifiers are located on rack and pinion driven blocks 75 and 76 which are retained to slide within the left and right carriage assemblies 70 and 71. The rack and pinion mechanism is similar to that depicted in FIG. 7 and allows the total intensifier assembly 20 to travel towards and away from the user's eyes for a distance of about 0.75" to give 15 mm of eye relief.

Figure 8:
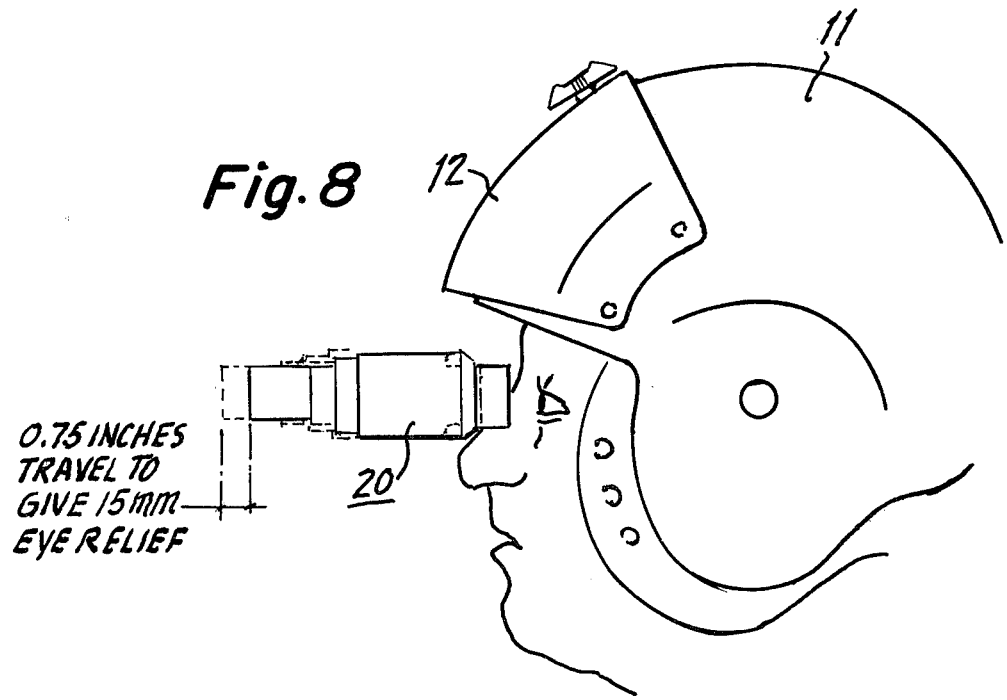
FIG. 8 is a partial side view of the apparatus showing eye relief adjustment.

As seen in FIG. 2, the members 75 and 76 are slidably located in suitable slots at the bottom of the carriage assemblies 70 and 71 and are guided by the slots to move as depicted in FIG. 8. The members 75 and 76 have a top surface containing a ratchet or gear tooth format and will move as depicted in FIG. 8 when either knob 96 or 97 is rotated to provide eye relief adjustment. The ratchet format is shown in FIG. 2 and a suitable gear may be coupled above the same within the housings 70 and 71 and secured to the ends 72 and 72A of the shaft 65. Many techniques for fabricating and implementing such gear arrangements are known in the art.

Again the controls 96 and 97 are dual to maintain left and right optional symmetry of design. The distance of 0.75" has been determined in conjunction with head length as well as the occiput-external canthus distance. With the above noted data, the distance of 0.75" will give effective eye relief for the wide range of aviator population.

Again referring to FIG. 2, each intensifier assembly contains an eyepiece diopter adjustment ring as 100 for intensifier 23. The eyepiece diopter ranges from +2 to −6 at 15 mm of eye relief.

As shown in FIG. 9, the eyepiece lens assembly 101 of FIG. 2 typically travels in and out without any rotation as it is slidably mounted within the central housing 103 of the intensifier assembly section 23. The eyepiece ring 101 is circular and contains a series of finger levers about its periphery. The ring may be rotated through approximately 100° of arc. The levers provide a reliable finger tip grip adjustment and as positioned about the periphery, insure that there will always be at least one lever available for the aviator to adjust the eyepiece. Eyepiece diopter adjustment is conventional and known in the art.

As indicated, each intensifier assembly is associated with an objective lens contained in a housing as 60 and 61. The objective focus range is from infinity to 25 centimeters with adjustment accompanied by a focusing ring as ring 105 associated with intensifier 23.

Referring to FIG. 10, the ring 105 is secured to the objective lens assembly 60 for the intensifier assembly 23 and is secured to the assembly 60 by means of a set screw 106 which is coupled through an upstanding flange 107. The preferred rotation is approximately 180° and each objective lens associated with intensifiers 22 and 23 is separately adjusted. The objective focusing is relatively infrequent.

Referring to FIG. 10, it is noted that focusing is occasionally accomplished between infinity for viewing outside the aircraft and between maps and the instrument panel. The apparatus depicted in FIG. 10 enables a two detent focusing system. Each objective lens has two pressed detents which are located beneath the focusing ring 105 and on the objective lens housing. In this manner, the pilot can quickly rotate the objective focusing ring 105 until he feels the detent position so that he knows he will be in focus for near or far viewing. There are many techniques for performing a preset detent operation. For example, captive rings can be positioned on the objective lens housings which contain female detents on their inside surfaces and so on.

It should be clear that the above described assembly can be adopted to accommodate any helmet and visor shape as long as the general characteristics of the assembly are maintained.

As above indicated, a prime consideration of any such design is the selection of materials to provide necessary mechanical reliability with required temperature operations. Such materials as polyarylene ether are employed because of its dimensional stability in low temperatures and excellent mechanical and dielectric properties. Many of the units, such as the power pack, can be injection molded and formed from suitable plastics. Such assemblies as the vertical fork 16 should provide maximum rigidity and preferably are fabricated from a light material such as aluminum alloys, as for example, would be the tilt adjustment rods as 77 and 78.

In order to give one some idea of the typical size of the mechanical assembly depicted in FIG. 2, some typical dimensions of the various components will be given. The battery pack 40 is approximately $2\frac{1}{2}$" wide by $1\frac{1}{4}$" high and a width from the velcro surface 41 to the rear of the platform containing the control knob 43 is 1.45". The helmet mount plate 15 has a length from top to bottom of about 2.4" with a width of about 1.5". The control knob 13 has an outer diameter of 1.25" with a width of about 0.7". The fork assembly 16 has an overall length of about 3.56" with a distance of 0.95" from tip of pivot 18A to the tip of pivot 18B. Each tine of the fork 16 is approximately 0.45" in width. The tilt adjustment gear box 60 is approximately 1.51" in width and 1.75" in length and about 0.85" in height. The tilt adjustment rod which extends through the gear box as 77 and 78 is approximately 3.72" in length and 0.153" in diameter. The tilt adjust knobs as 79 and 80 have an effective length of about 0.74" with an outer diameter of 0.437". The carriage assemblies 70 and 71 are approximately 1.6" in length, 0.50" in width with the circular apertured projections being each about 0.5" in height. The interpupillary adjust knob 50 has an outer diameter of 0.437". The threaded portions 52 and 53 comprise a right hand and a left hand acme thread. Each threaded portion is approximately 0.905" in length with the smooth rod portion 72 being about 0.158" in diameter with an outer thread diameter of 0.281". The fore-aft adjustment knobs 97 and 96 are relatively of the same outer dimensions as the knobs 79 and 80. The image intensifier tube housing is approximately 2.2" in length with an outer diameter of about 1.42". The eyepiece section 101 is approximately 0.8" in length with a nominal diameter of 1.4".

As indicated, the cable 30 is directed through the helmet mount assembly via aperture 110 of FIG. 2 and contains movable electrical contacts which will close when the fork assembly 16 is rotated in the operating position as, for example, shown in FIGS. 6 and 8 to thus power the image intensifier tubes contained in housings 22 and 23. Such connectors are well known in the art and essentially, are standard three conductor assemblies, which contacts are fabricated from alloys containing precious metals as well as copper and zinc for reliability of contact and to prevent corrosion. Such techniques are well known.

Referring to FIG. 11, there is shown a front plan view of the apparatus. The fork assembly 16 is directed through the apertures 62 and 63 of the gear box assembly 60. The fork has a bottom stop portion 120 between the times to prevent the same from being removed from the gear box housing after insertion.

As shown in FIG. 7, the fork is maintained within the housing by the ratchet and gear assembly operated and controlled by the tilt controls 80 and 90 as coupled to the rotatable shafts 77 and 78. The locking shoulders 46A and 46B abut against the front surface of the helmet mounting assembly 15 when the night vision imaging system is in the working position aas depicted in FIG. 7. When the unit is flipped up, the shoulders ride over the U-shaped receptacles 17A and 17B to lock the assembly in place, as above described.

As can be seen from both FIGS. 11 and 2, the helmet mount assembly 15 has two front guide and stiffening ribs 121A and 121B to form a V-shaped slot. This enables accurate positioning of the intensifier assembly when it is to be inserted into the helmet mounting assembly as depicted in FIG. 3. In this manner, the ribs 121A and 121B act as a guide so that the user may feel the general area of insertion and further act to strengthen the entire helmet mount assembly 15.

The image intensifier tube which is contained in housings 22 and 23 is well known in the art and for example, is employed in the above noted goggles as manufactured by the Assignee herein. Basically, each image intensifier assembly 22 and 23 is a unity power telescope in combination with an image intensifier. The optics or lens assemblies for the telescope as the objective lens and the eyepiece lenses are fabricated from aspheric optical elements employing injection molded polymer optical materials for low weight. The wide use of aspherics enables the number of optical surfaces to be held to a minimum, to thereby minimize specular reflection loss which might contribute to the stray light level.

The objective lens is a compound lens, as is known, with relatively low distortion. The lens may include seven separate aspheric surfaces to provide a relative illumination level of about forty-five percent at the field's edge, rising to sixty-two percent at 17° off axis. The total lens assembly weighs about ten grams. In a similar manner, the eyepiece assembly can employ two aspheric surfaces in a three element form with a doublet eye lens group. A detailed discussion of the aspherical components as well as the image intensifier tubes is not warranted as the above mechanical apparatus for the helmet and image assembly enables a pilot to be provided with complete adjustment capability, easy operation in regard to image assembly mounting and control and the apparatus is extremely light (450 grams), while based on the design, achieving a weight distribution about the user's head to minimize fatigue caused by movement.

The simplicity of the operations necessary will become clearer in regard to the following description of typical operations.

The first step in the procedure is to attach the helmet mount assembly 15 (FIG. 2) within the visor slot 14 (FIG. 1). Without pushing in the locking knob 13, the user rotates the same fully anti-clockwise. The knob is then pressed in and rotated until the T locking bar 50 (FIG. 5) is aligned vertically with the protruding rib 56 (FIG. 5) on the back of frame 15. The U shaped receptacles 17A and 17B are toward the rim of the helmet, the knob 13 toward the crest. The T bar is inserted into the slot with the assembly 15 flush against the visor. The knob is then rotated clockwise to clamp down the mounting assembly.

The power cable 30 is directed over the crest of the helmet and the connector 44 (FIG. 2) is inserted into the connector 43 and the power pack is pressed unto the velcro path of the helmet (not shown).

The image assembly 20 is then grasped and held above the mount assembly 15 (FIG. 13) and lowered until the fork pins 18A and 18B (FIG. 2) are guided into the U shaped receptacles 17A and 17B (FIG. 2). There is a fifty degree angle of acceptance in the vertical plane (FIG. 3). The pins click into the receptacle and are fully seated. When in place, the image assembly 20 can be swung down into the viewing position (FIGS. 4 and 6) or swung back up.

To remove the image assembly, the assembly 20 is swung up into the flip-up position (FIG. 4) and is pulled vertically upward and out. To remove the helmet mounting assembly 15 from the visor, the power pack 40 is pulled from the velcro path; the mounting knob 13 is rotated fully clockwise and pushed in and rotated 90° either way. This then removes the assembly 15 from the visor. The helmet mounting assembly can also be removed with the imager assembly mounted on it as should be clear.

Thus, from the above description, the extreme versatility and usefulness of the apparatus should be clear. The features implemented are directed to ease of attachment and removal as well as individual set up and adjustment for a wide aviator population. The apparatus possesses a symmetrical layout which permits left or right handed adjustments, without a weight penalty. All adjustments can be made on the ground or in flight, while wearing the helmet. One only requires a simple hand operation for attachment and removal of the imaging assembly. The user can implement adjustments while flying to accommodate pitch, helmet movement or slump in posture and the adjustments do not interact one with the other. Once adjustment is made by a user, they remain fixed after successive removals or flipping of the structure. The apparatus eliminates prior support means and does not contact the user's face. Power is disconnected when the unit is "flipped up" to save energy. The unit provides a minimum of visual obscuration from adjustment and retaining mechanisms when in the down position and hence, peripheral vision is unobscured. When in the "flipped-up" position, a full unobstructed view exists as no part of the assembly is in the aviator's field of view. No mechanism, with the exception of the eyepieces, are near the user's eyes; thus hazards from high g movements are minimized. As indicated, the power supply switch is centrally located and is operable by either hand with the power cable being extendable for alternate location of the power housing. The image assembly does not exceed the height of the crest of the helmet when in the flipped-up position and all adjustment features are optimumly and rapidly performed when required.

Thus, the utility and advantages of the apparatus should be apparent to those skilled in the art and all modifications and alternative embodiments are deemed to be encompassed within the spirit and scope of the claims appended hereto.

We claim:

1. A night vision imaging apparatus for mounting on a helmet comprising:

a helmet mount assembly secured to said helmet at a front surface above the position of the eyes of a user when said helmet is being worn, said assembly containing a first pivot receptacle positioned on said assembly closest to the eyes of said user, an image intensifier assembly having a first and a second tubular housing each containing a night vision imaging optical system and spaced apart according to the separation of the eyes of said user, said assembly including a central support arm centrally positioned between said tubular housings and having a second pivot means for engaging said first pivot receptacle and including locking means for enabling said intensifier assembly to be "flipped-up" and locked in position away from the eyes of said user and to maintain said position and to be "flipped-down" by said user from said locked position to cause said tubular housings to be respectively positioned in front of said user's eyes, said first pivot receptacle comprising a "U" shaped receptacle, and said second pivot means comprising a pivot rod coupled to the top of said central support arm and transverse thereto for coacting with said "U" shaped receptacle, and at least one locking shoulder positioned beneath said rod and adapted to coact with said "U" shaped receptacle when said intensifier assembly is positioned in the "flipped-up" mode.

2. The apparatus according to claim 1 further including
means located on said intensifier assembly for varying the position of said housings with respect to each other to accommodate for interpupillary separation of a user's eyes.

3. The apparatus according to claim 1 further including
tilting means coupled to said intensifer assembly for providing a tilt of said tubular housings with respect to a normal line of vision when said assembly is in the flipped-down position.

4. The apparatus according to claim 1 wherein
each of said tubular housings contains a unity power telescope night vision optical system.

5. The apparatus according to claim 1 further including
adjustment means for moving said tubular housings away from and towards the eyes of said user in a relatively horizontal plane to provide eye relief.

6. The apparatus according to claim 1 including
vertical adjustment means located on said helmet mount assembly and operative to move said image intensifier assembly in the vertical plane to allow a user to vertically align said tubular housings with his eyes.

7. The apparatus according to claim 1 wherein
said central support arm is an arcuate arm of a fork-like configuration.

8. The apparatus according to claim 1 further including
a power pack housing adapted to be mounted on said helmet for supplying power to said night vision optical systems, a cable directed from said pack to said helmet assembly.

9. A night vision imaging system for mounting on a helmet or similar article comprising:
a helmet mount assembly having a relative planar surface of a curvature corresponding to the curvature of said helmet and secured to said helmet at a front surface above the position of the eyes of a user when said helmet is worn, said mount assembly containing a "U" shaped receptacle positioned on said assembly closest to the eyes of said user, an image intensifier assembly having a first tubular housing for containing an intensifier tube and associated with a first eye of said user and a second tubular housing for containing an intensifier tube and associated with a second eye of said user, a central housing assembly positioned between said first and second tubular housings, said central housing including a right and a left carriage assembly with said right assembly coupled to said first tubular housing and said left assembly coupled to said second tubular housing, an arcuate support frame coupled to said central housing at one end and having pivot means at said other end adapted for insertion into said "U" shaped receptacle, to enable said intensifier assembly to pivot upwards manifesting a non-operative position to permit said user to achieve an unobstructed view, said support frame including means for locking said intensifier assembly in said position, and to pivot downwards under the control of said user to position said first and second tubular housings in front of the eyes of said user when said helmet is accommodated on the head of said user.

10. The night vision system according to claim 9 wherein
said helmet includes a central vertical slot directed towards a rim located above the eyes of a user when said helmet is worn, said mount assembly having a rotatable T bar on a rear surface, and a control known rotatably positioned on said front surface and coupled to said T bar to rotate said bar for emplacement of said bar in said slot when the top arm of said T is in the vertical plane and to lock said T bar within said slot when the top arm of said T is rotated to the horizontal plane, whereby said mount assembly can be adjusted within said slot to thereby vary the vertical position of said intensifier assembly with respect to the eyes of said user.

11. The night vision system according to claim 9 wherein
said "U" shaped receptacle comprises a right and a left "U" shaped member positioned at a right and a left side of said helmet mount assembly.

12. The night vision imaging system according to claim 9 wherein
each of said first and second tubular housing contains an objective lens at an end remote from the user's eyes and an eyepiece lens in proximity with the user's eyes.

13. The night vision imaging system according to claim 9 wherein
said central housing has a first and a second extending flange, each flange having a corresponding coaxial aperture adapted to receive a rotatable shaft, said shaft having right and left threaded sections as positioned through said apertures and a left and a right end coupled respectively to said left carriage assembly and said right carriage assembly, said shaft adapted when rotated by a force exerted between said flanges to deflect said flanges to vary the distance of said tubular housings with respect to the eyes of said user to provide interpupillary adjustment.

14. The night vision imaging system according to claim 13 wherein said shaft as coupled to said carriage assemblies is directed through corresponding apertures in a surface of said carriage assemblies, with each assembly including a slidable bottom member coupled to said tubular housing to cause said housings to move away from the eyes of a user in a direction to provide eye relief adjustment.

15. The night vision apparatus according to claim 9 wherein said central housing has a passageway for receiving a second shaft, with said second shaft directed through said passageway and rotatably mounted via apertures in said carriage assembly, said central housing containing a gear assembly within the hollow of said housing and operative by the rotation of said second shaft, said gear assembly coacting with a ratchet assembly positioned on said arcuate support frame as coupled to said central housing to variably tilt said tubular housings with respect to said helmet in a direction to adjust tilt range for said user.

16. The night vision imaging system according to claim 9 wherein said arcuate support frame is of a fork-like configuration having a left arcuate tine depending from a top support base and a right arcuate parallel tine depending from said support base.

17. The night vision imaging system according to claim 16 wherein said central housing has a first and a second slot on a top surface with said slots adapted to receive said tines and means for securing said tines within said central housing.

18. The night vision imaging system according to claim 9 further including a power pack housing having an internal hollow for containing a source of power, said housing having a front arcuate surface adapted to conform to a rear surface of said helmet and a cable extending from said pack and coupled to said helmet mount assembly for providing power to said intensifier tubes.

19. The night vision imaging system according to claim 18 wherein said arcuate surface includes fastening means for securing said housing to said helmet.

20. The night imaging system according to claim 10 wherein said range of vertical adjustment is between 1 to 1.5 inches.

21. The night vision imaging system according to claim 13 wherein the range of interpupillary adjustment is between 50 to 75 mm.

22. The night vision imaging system according to claim 14 wherein the range of eye relief adjustment is between 0 to 1 inch to afford about 15 mm eye relief.

23. The night vision imaging system according to claim 15 where the range of tilt adjustment is between +10° to −14° of arc.

24. A night vision imaging apparatus for mounting on a helmet, comprising:

a helmet mount assembly secured to said helmet at a front surface above the position of the eyes of a user when said helmet is being worn, said assembly containing a "U" shaped pivot receptacle positioned on said assembly closest to the eyes of said user, an image intensifier assembly having a first and a second tubular housing each containing a night vision imaging optical system and spaced apart according to the separation of the eyes of said user, said assembly including a support member centrally positioned between said tubular housings and having pivot means extending from opposite sides of said support member, said pivot means engaging said "U" shaped pivot receptacle for enabling said intensifier assembly to be "flipped-up" to a position away from the eyes of said user and to be "flipped-down" from said locked position to cause said tubular housings to be respectively positioned in front of said user's eyes, and locking means for maintaining said intensifier assembly in said "flipped-up" position.

25. A night vision imaging system for mounting on a helmet comprising:

a helmet mount assembly having a relative planar surface of a curvature corresponding to the curvature of said helmet and secured to said helmet at a front surface above the position of the eyes of a user when said helmet is worn, said mount assembly containing a "U" shaped receptacle positioned on said assembly closest to the eyes of said user, an image intensifier assembly having a first tubular housing for containing an intensifier tube and adapted to be associated with a first eye of said user and a second tubular housing for containing an intensifier tube and adapted to be associated with a second eye of said user, a central housing assembly positioned between said first and second tubular housings, said central housing including a right and a left carriage assembly with said right assembly coupled to said first tubular housing and said left assembly coupled to said second tubular housing, a support frame coupled to said central housing at one end and having pivot means at said other end, said pivot means extending from opposite sides of said support frame into engagement with the parallel arms of said "U" shaped receptacle to enable said intensifier assembly to pivot upwards manifesting a non-operative position to permit said user to achieve an unobstructed view and to pivot downwards under the control of said user to position said first and second tubular housings in front of the eyes of said user when said helmet is accommodated on the head of said user, and means for retaining said intensifier assembly in said non-operative position.

* * * * *